United States Patent [19]

Di Giovanni

[11] 4,019,601
[45] Apr. 26, 1977

[54] AUTOMATIC CONTAINER-BEARER BAR FOR MOTOR VEHICLES

[76] Inventor: Italo Di Giovanni, Via Francesco Hayez, 6, 20129 Milan, Italy

[22] Filed: Apr. 25, 1975

[21] Appl. No.: 572,495

[30] Foreign Application Priority Data

May 6, 1974 Italy .................................. 22309/74

[52] U.S. Cl. .............................. 180/90; 224/29 K; 224/29 L; 224/42.41; 224/42.44; 312/313; 312/323

[51] Int. Cl.² ........................................ B60K 37/04

[58] Field of Search .................... 180/90; 280/227; 224/29 R, 29 K, 29 L, 42.41, 42.43, 42.44, 42.46 R; 312/313, 323; 217/21

[56] References Cited

UNITED STATES PATENTS

| 91,884 | 6/1869 | Thompson | 217/21 |
|---|---|---|---|
| 716,644 | 12/1902 | Perthold | 217/21 |
| 1,078,249 | 11/1913 | Burns | 312/312 X |
| 1,857,824 | 5/1932 | Scholz | 224/29 L X |
| 1,893,624 | 1/1933 | Jay | 224/29 K |
| 2,112,471 | 3/1938 | Sevelle | 180/90 |
| 2,284,811 | 6/1942 | Ferrelle | 312/313 X |
| 2,547,083 | 4/1951 | Lundgren | 312/323 X |
| 2,749,143 | 6/1956 | Chika | 280/150 B |
| 2,752,219 | 6/1956 | Yonkers | 312/323 X |
| 3,003,786 | 10/1961 | Liston | 280/150 B |
| 3,586,410 | 6/1971 | Barrow | 312/313 X |
| 3,606,112 | 9/1971 | Cheshier | 224/42.44 |
| 3,866,866 | 2/1975 | Kneile | 312/323 |

Primary Examiner—Joseph F. Peters, Jr.
Assistant Examiner—John P. Silverstrim
Attorney, Agent, or Firm—John C. Smith, Jr.

[57] ABSTRACT

A bar for motor vehicles includes a box-like container which is pivotally mounted on a horizontally disposed sliding mechanism beneath the dashboard. The container is slidable from a storage position beneath the dashboard where it is horizontally disposed and is then pivotable to a vertical position at least partially in front of the dashboard for access to the contents of the container.

10 Claims, 13 Drawing Figures

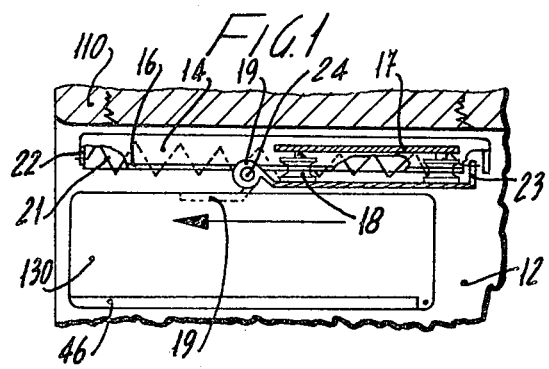
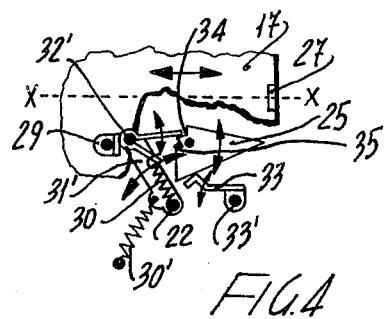
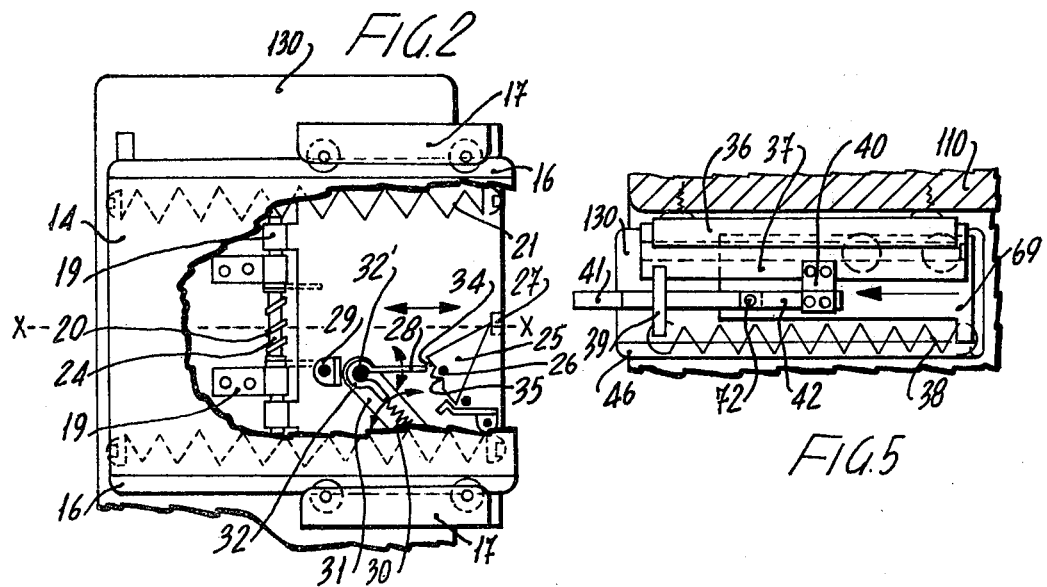
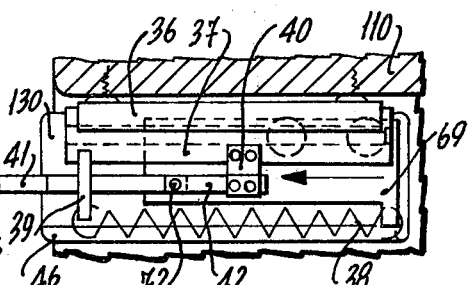
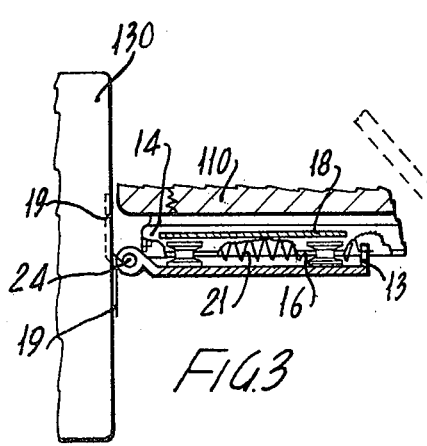
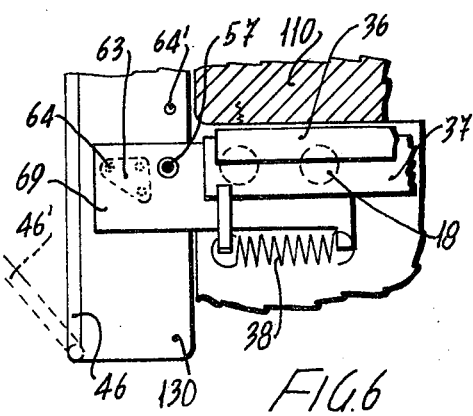

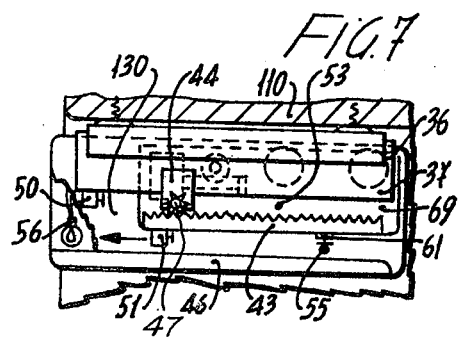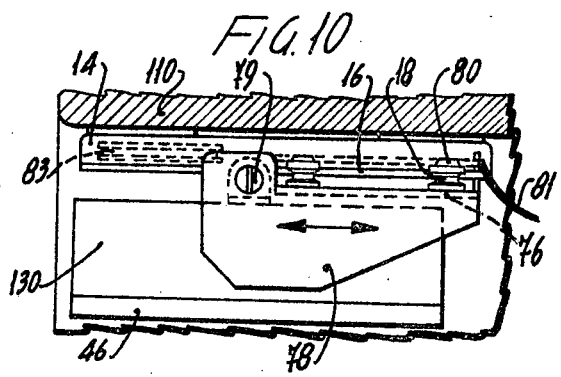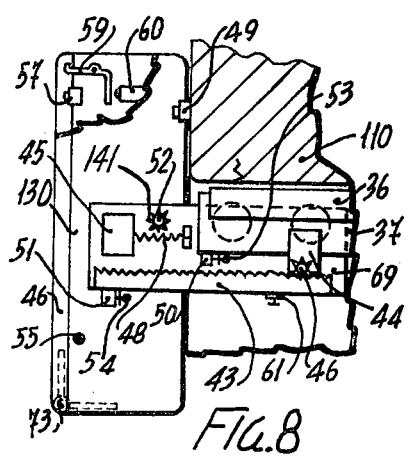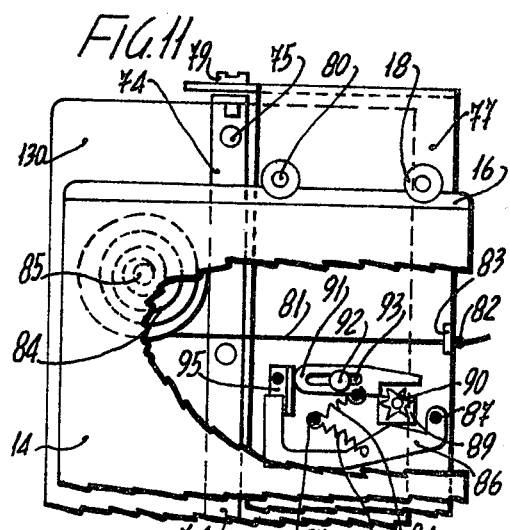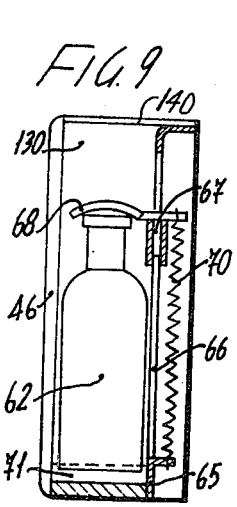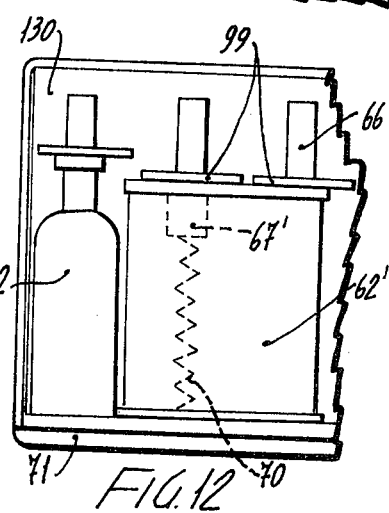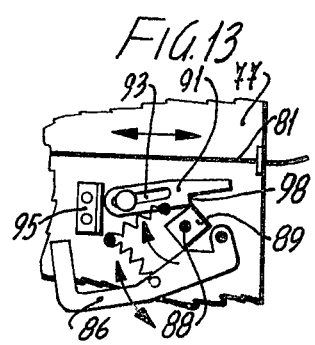

AUTOMATIC CONTAINER-BEARER BAR FOR MOTOR VEHICLES

Motor vehicle "bars" are known and substantially consist of a sort of cabinet, wherein the bar articles (such as bottles and the like) are accomodated.

Such bars suffer from several disadvantages and mainly the inconsistence between a reduced overall size in the car and a ready access to the articles from the user.

The object of the present invention is to provide a "motor vehicle bar" characterized by devices for allowing it to nearly automatically take two positions, the first of which being a recessed, almost horizontal, reduced overall size, "rest" position, and the second being an advanced, vertical "hand-reach" position for "drink," the whole as shown by the diagrammatic accompanying drawings, in which:

FIGS. 1 and 2 are side and plan views, respectively, showing the bar at recessed position;

FIG. 3 is a side view of the bar at advanced position;

FIG. 4 shows a detail of the bar;

FIGS. 5 and 6 are respectively side views showing a second embodiment of the bar at recessed position;

FIGS. 7 and 8 show a third embodiment of the bar as electrically operated; and

FIG. 9 is a cross-sectional view showing the anchoring system for the articles in the bar.

FIGS. 10 to 13 represent another improved embodiment.

The device according to the invention comprises a cabinet container 130 which is slidably mounted and tiltable in a plate-like support 14 having side guides 16 and being preferably attached under the dashboard 110 within the underlying space 100. The cabinet container 130 includes top 140 and bottom 71 ends and side walls, one of which is shown at 141, and a door 46.

Grooved rollers 18 slide on said side guides 16 and are mounted on a slide 17, at the front carrying a hinge or pivot 19, the latter being under the action of a torsion spring 20.

This slide is under the pull or bias of springs 21, causing the exit of container 130. Springs 21 are anchored to support and slide hooks 22 and 23, respectively.

In FIGS. 2 and 4, a triangularly shaped rocking lever 25 is shown, the base of which has two cam notches.

A tooth 28, as urged by a hammer 29 fast with slide 17, will encounter along its travel the left-hand (relative to the movement of said tooth) notch 34, or the right-hand notch 35, depending on whether the rocking lever tip is rightward or leftward facing.

Said tooth 28 has a C-shaped guide head 32 turning about pin 32' and continues with a hooked tail 31, to which one end of spring 30 is attached, the other end of which is attached to pin 22, a small bar or rod 31' being rotable on the latter as stretched by a spring 30' which is anchored to a fixed location of the support.

Rocking lever 25 is stabilized at the two positions of FIGS. 2 and 4 through the action of a spring 33 anchored at 33' to support 14. Pins 26 and 22 are also attached to said support 14.

FIGS. 5 and 6 show a somewhat different approach from that shown in the foregoing. Thus, provision is made for a jumper or cross connection support 36 having side guides 37, the grooved rollers 18' of slides 69 rotating therein, and a control or drive lever 41, the latter disconnecting a spring 42, thus releasing a head 72 from a housing provided on said slides 69 and accordingly releasing said container 130, which is allowed to move forward and then to tilt on pin 57 due to the action of a spring 38, as well as a torsion spring (not shown), arranged about pin 37. The head 64 of a spring 63 is for locking the container at horizontal position by penetrating into a housing 64'.

IN FIGS. 7 and 8, provision is made for installing motors 44 and 45, respectively driving a pinion 47 acting upon a rack 43 and worm 48 (acting upon a pinion 52), causing said container 130 to translate and rotate, respectively.

Limit switches 50, 51, 61 are provided, as operated by pawls 53, 54 and 55 arranged on the slides and container, respectively.

The bottles and other vessels in the container are clamped or retained by devices for preventing any overturning and clinking thereof, as shown in FIG. 9.

The several operations relating to installation of the container on a motor vehicle and operation thereof are set forth hereinafter.

The plate support 14 or jumper support 36 is installed on a motor vehicle preferably at horizontal position under dashboard 110. The central slide 17 or side guides 69 (FIG. 5) can move on the support. Container 130 can rotate about pin 24 (FIGS. 1 and 3 ) or pin 57 (FIG. 6) which are secured to the slides. In order to pass from retracted position (FIGS. 1, 2, 5, and 7) to advanced position (FIGS. 3, 6 and 8), the translation movement being provided by springs 21 and 38 or motor 44, whereas tilting movement is provided by springs 20 or motor 45. Various systems are provided for controlling "outgoing" of container 130, that is to start the sequence of movements for the container.

In the exemplary embodiment of FIGS. 1–4, on inwardly pushing container 130 and accordingly also slide 17, the hammer 29 secured to the latter will urge in turn tooth 28 within the left-hand notch 34 of rocking lever 25, causing it to rotate and the position shown in FIG. 4, that is out of the path X—X for tang 27 of slide 17. Therefore, once released, said container 130 can begin to move and when at the outside, can tilt through 90° due to spring 20, taking the "drink" position (FIG. 3). At the same time, tooth 28 is moved back as pulled by spring 30'.

In the exemplary embodiment of FIGS. 5 and 6, by acting on lever 41, spring 42 is disconnected and releases its head 72 from a housing provided on slides 69, thus allowing the container 130 to move owing to springs 38.

The bottles and other bar articles are anchored or retained to container 130 through the heads 68 of slides 67 sliding on slots 66 and pulled by springs 70. A lamp 56 (FIG. 7) is provided and lit by switch 57 (FIG. 8) when door 46 opens by turning about hinge or pivot 73. Said door can be also automatically opened by an electromagnet 60 operated by a limit switch as soon as said container 130 reaches its "advanced" position. Return of container 130 to its retracted position is manually effected or by acting on a further switch. Thus, on being inwardly urged or pushed, said container is then clamped by rocking lever 25 which by the action of tooth 28 on right-hand notch or depression 35 is moved back to the position shown in FIG. 2, that is on the path of tang 27 fast with slide 17, or is clamped by head 72 of spring 42 (FIG. 5), or by other systems.

In the improved embodiment shown in FIGS. 10–13, like reference numerals have been used for the same elements set forth in FIGS. 1–9 of the foregoing embodiments.

On the other hand, the novel elements or parts have been designated by different reference numerals.

A fork 74 is attached to the container by means of rivets 75. Slide 76 comprises a bridge element 77 connecting the two sides or flanks 78. A pin 79 connects said fork 74 to the flanks, thus enabling container 130 to rotate. The grooved rollers 18 for sliding on guides 16 of support 14 rotate on pins 80 which are attached to said bridge element 77. The pull action for container exit is assured by a cable 81, one end of which is secured by a knot 82 to plate 83 fast with slide 76, whereas the other end is entrained about a drum 83 which through a flat coil spring 84 (accomodated within said drum) is connected to a pin 85, the latter being fast with said support 14.

Container locking at retracted position is assured by a hook 86 rotable on pin 87 which is fast with support 14 (FIG. 11). Said support 14 has also attached thereto a pin 88 about which cam 89 fast with gear wheel 90 rotates.

Slide 91 can move along and rotate about pin 92 which penetrates into its slot 93 and is pressed by a spring 94 both against a plate 95 secured to slide 76 and against the cam. A spring 96, which is anchored to a pin 97, provides for retaining the hook against said cam. In order to disconnect container 130, it will suffice to inwardly urge or push it. In turn, said plate 95 fast with slide 76 urges or pushes the slide which by means of its tooth 98 rotably drives the gear wheel and accordingly the cam to the position shown in FIG. 13.

The cam moves said hook 86 away from path X—X of plate 95 (FIG. 13) and therefore said container is moved to its advanced position as pulled by the cable, the latter in turn being drawn by spring 94. In order that the container be clamped again at retracted position, it will suffice to inwardly urge or push it again. In turn, said plate 95 urges or pushes again the slide, rotating the cam to the position shown in FIG. 11 and moving the hook back to the plate path.

Anchoring or clamping of bar articles though pressure slides is characterized by almost adjacent, flat brackets 99 (FIG. 12). Such features enable approaching of bar articles having different height and width without it being necessary for an article to coincide with each bracket. It will be the latter to automatically accomodate the different heights and widths of the articles, building up a sort of continuous pressure line with elements having same or different height, as the case may be.

Since the invention has been described and shown by mere way of unrestrictive example, it should be understood that the invention can be susceptible to many changes and modifications as to structure or construction, depending on the particular conveniences and industrial production requirements and the like, and can include as well other systems and means in addition or in alternative or replacement, the whole without departing from the scope of the invention. Therefore, it is to be understood that the patent application will comprise any equivalent application of such inventive concepts and any equivalent product made and/or operating according to anyone or more of the disclosed features.

What I claim is:

1. A bar for bottles and the like for use in a motor vehicle, said bar comprising:
   a. a cabinet container having top and bottom ends and side walls when in a vertical position,
   b. elongated guide means adapted to be mounted beneath the dashboard of said vehicle and to extend substantially horizontally from the face of said dashboard towards the front of said vehicle,
   c. slide means arranged to slide along the length of said guide means,
   d. pivot means for pivotally securing one of said side walls of said container at a position intermediate the top and bottom ends thereof to said slide means,
   e. a rack, a sprocket wheel engaging said rack, and a first motor for driving said sprocket wheel to move said slide means horizontally along said guide means, and
   f. a worm gear and a second motor for driving said worm gear to pivot said container,
   e. whereby said container may be moved from said horizontal storage position horizontally along said guide means towards the rear of said vehicle and then pivotally upwardly to said vertical position such that a portion of said container extends above the plane of said guide means for access by an occupant of said vehicle and subsequently may be returned to said storage position when not in use.

2. A bar for bottles and the like for use in a motor vehicle, said bar comprising:
   a. a cabinet container having top and bottom ends and side walls when in a vertical position,
   b. elongated guide means adapted to be mounted beneath the dashboard of said vehicle and to extend substantially horizontally from the face of said dashboard towards the front of said vehicle,
   c. slide means arranged to slide along the length of said guide means,
   d. pivot means for pivotally securing one of said side walls of said container at a position intermediate the top and bottom ends thereof to said slide means,
   e. first means biasing said slide means for movement along said guide means towards the rear of said vehicle and second means biasing said pivot means for pivotally moving said container upwardly to said vertical position, and
   f. means for retaining and for automatically releasing said slide means at a horizontal storage position,
   g. whereby said container may be automatically moved from said horizontal storage position horizontally along said guide means towards the rear of said vehicle and then pivotally upwardly to said vertical position such that a portion of said container extends above the plane of said guide means for access by an occupant of said vhicle and subsequently may be returned to said storage position when not in use.

3. A bar as claimed in claim 2 wherein said first biasing means is a helicoidal spring.

4. A bar as claimed in claim 2 wherein said first biasing means is a coil spring.

5. A bar as claimed in claim 2 wherein said second biasing means is a torsion spring.

6. A bar as claimed in claim 2 wherein said retaining and releasing means comprises clamping means to retain said container in said horizontal position.

7. A bar as claimed in claim 6 wherein said clamping means comprises a tooth movable between rest and working positions and controlled by the horizontal movement of said container and a rocking lever movable by said tooth.

8. A bar as claimed in claim 6 wherein said clamping means comprises a tongue rigidly attached to said slide means, a toothed slide arranged to be pushed by said tongue, a gear wheel arranged to be operated by said toothed slide, a cam arranged to operate with said gear wheel and a pivoted hook arranged to be operated by said cam whereby said cam causes said hook to alternately hook and unhook said slide means with each slide stroke of said container.

9. A bar as claimed in claim 2 wherein said cabinet container comprises at least one spring-biased retaining means for contacting the top of a bottle and pressing said bottle against the bottom end of said container.

10. In a motor vehicle a bar for bottles and the like comprising:
 a. a cabinet container having top and bottom ends and side walls when in a vertical position,
 b. elongated guide means mounted beneath the dashboard of said vehicle and extending substantially horizontally from the face of said dashboard towards the front of said vehicle,
 c. slide means arranged to slide along the length of said guide means,
 d. pivot means for pivotally securing one of said side walls of said container at a position intermediate the top and bottom ends thereof to said slide means,
 e. first means biasing said slide means for movement along said guide means towards the rear of said vehicle and second means biasing said pivot means for pivotally moving said container upwardly to said vertical position, and
 f. means for retaining and for automatically releasing said slide means at a horizontal storage position,
 g. whereby said container may be automatically moved from said horizontal storage position horizontally along said guide means towards the rear of said vehicle and then pivotally upwardly to said vertical position such that a portion of said container extends above the plane of said guide means for access by an occupant of said vehicle and subsequently may be returned to said storage position when not in use.

* * * * *